United States Patent
Healy et al.

(10) Patent No.: US 11,505,030 B2
(45) Date of Patent: Nov. 22, 2022

(54) THERMAL MANAGEMENT SYSTEM FOR RANGE EXTENDER VEHICLE

(71) Applicant: Hyliion Inc., Cedar Park, TX (US)

(72) Inventors: Thomas Healy, Austin, TX (US); Patrick Sexton, Austin, TX (US); Robert Butler, Liberty Hill, TX (US); Brian Schoolcraft, Cedar Park, TX (US)

(73) Assignee: HYLIION INC., Cedar Park, TX (US)

(*) Notice: Subject to any disclaimer, the term of this patent is extended or adjusted under 35 U.S.C. 154(b) by 36 days.

(21) Appl. No.: 17/238,871

(22) Filed: Apr. 23, 2021

(65) Prior Publication Data

US 2021/0331553 A1 Oct. 28, 2021

Related U.S. Application Data

(60) Provisional application No. 63/019,676, filed on May 4, 2020, provisional application No. 63/014,790, filed on Apr. 24, 2020.

(51) Int. Cl.
*F25D 23/12* (2006.01)
*B60H 1/00* (2006.01)
(Continued)

(52) U.S. Cl.
CPC ..... *B60H 1/00278* (2013.01); *B60H 1/00378* (2013.01); *B60H 1/00392* (2013.01);
(Continued)

(58) Field of Classification Search
CPC ........... B60H 1/00278; B60H 1/00378; B60H 1/00392; B60H 1/00485; B60H 1/025; B60H 1/03; B60H 1/3205; B60H 2001/00307; B60H 2001/3255; B60H 2001/3285; B60L 50/62
(Continued)

(56) References Cited

U.S. PATENT DOCUMENTS

2016/0318499 A1   11/2016 Yamanaka et al.
2018/0222286 A1*  8/2018 Blatchley ........... B60H 1/00885

FOREIGN PATENT DOCUMENTS

DE   102018212691 A1   1/2020
EP       2977254 A1    1/2016
FR       2993642    *  1/2014

OTHER PUBLICATIONS

International Search Report and Written Opinion, Application No. PCT/US2021/028944, dated Aug. 20, 2021, 14 pages.

* cited by examiner

*Primary Examiner* — Davis D Hwu
(74) *Attorney, Agent, or Firm* — Baker Botts L.L.P.

(57) ABSTRACT

An electric drivetrain for installation in a vehicle chassis. A generator coupled to an engine generates electric power for charging an array of batteries. The vehicle, including components and subsystems, may be powered electrically from the batteries, allowing the engine and generator to be easily replaced or customized for an industry, geographic region, fuel type, or a set of emission requirements. A thermal management system may determine a battery temperature for the set of batteries and cause one or more of a coolant system, a refrigerant system, an exhaust gas system or an ambient air heat exchanger to add heat to the set of batteries or transfer heat away from the set of batteries.

8 Claims, 10 Drawing Sheets

(51) Int. Cl.
  *B60H 1/02* (2006.01)
  *B60H 1/03* (2006.01)
  *B60H 1/32* (2006.01)
  *B60L 50/62* (2019.01)

(52) U.S. Cl.
  CPC ......... *B60H 1/00485* (2013.01); *B60H 1/025* (2013.01); *B60H 1/03* (2013.01); *B60H 1/3205* (2013.01); *B60L 50/62* (2019.02); *B60H 2001/00307* (2013.01); *B60H 2001/3255* (2013.01); *B60H 2001/3285* (2013.01)

(58) Field of Classification Search
  USPC ....................................................... 62/259.2
  See application file for complete search history.

THERMAL MANAGEMENT SYSTEM FOR RANGE EXTENDER VEHICLE

PRIORITY CLAIM

The present application claims priority to U.S. Provisional Patent Application Ser. No. 63/014,790, filed Apr. 24, 2020 and to U.S. Provisional Patent Application Ser. No. 63/019,676, filed May 4, 2020, which are incorporated by reference herein in their entirety.

BACKGROUND

Field of the Disclosure

This disclosure relates generally to vehicles and, more particularly, to a wheeled vehicle configured for use with different types of engines.

Description of the Related Art

Large vehicles may be used to efficiently transport cargo. Large, wheeled vehicles pull trailers to transport large volumes of cargo on land, wherein the combination of the vehicle and the trailer can weigh between 30,000 pounds up to 140,000 pounds for a tandem loaded trailer. These vehicles may be referred to as "powered semi-tractors", "semi-tractors", "semis", or "trucks." Trucks may be used on roads such as highways and in urban areas but may also be used on unimproved roads or uneven terrain. In a traditional truck with an internal combustion engine, the internal combustion engine may be sized in the range of 15 liters to provide enough power to propel the vehicle and the trailer.

SUMMARY

A vehicle may be configured with unique configurations capable of integrating one of several different types of engines to generate electric power for charging an array of batteries under a plurality of operating conditions.

A wheeled vehicle such as a truck may be configured with unique configurations capable of integrating an existing chassis with one of several different types of engines.

In one aspect, a truck comprises a chassis having a frame, a cab, an engine compartment and a plurality of axles coupled to the frame, a generator for coupling to an engine, a sealed battery compartment containing an array of batteries, a battery management system including a battery temperature control system configured to maintain an operating temperature of the batteries within a range of operating temperatures. The truck also comprises a control system including a processor configured to monitor the operating temperature of the batteries, monitor one or more environmental conditions, monitor a set of operating parameters of an engine coupled to the generator, and operate one or more of the engine and the batteries based on the operating temperature of the batteries, the one or more environmental conditions and the set of operating parameters of the engine coupled to the generator.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, embodiments are described as they pertain to a truck having a chassis, a cab, an engine compartment and a battery enclosure storing a plurality of batteries. Embodiments may also pertain to other wheeled vehicles with more or fewer axles and other vehicles including marine vehicles.

Particular embodiments may be best understood by reference to FIGS. 1A-1B, 2, 3 and 4A-4E, wherein like numbers are used to indicate like and corresponding parts.

Figure 1A:
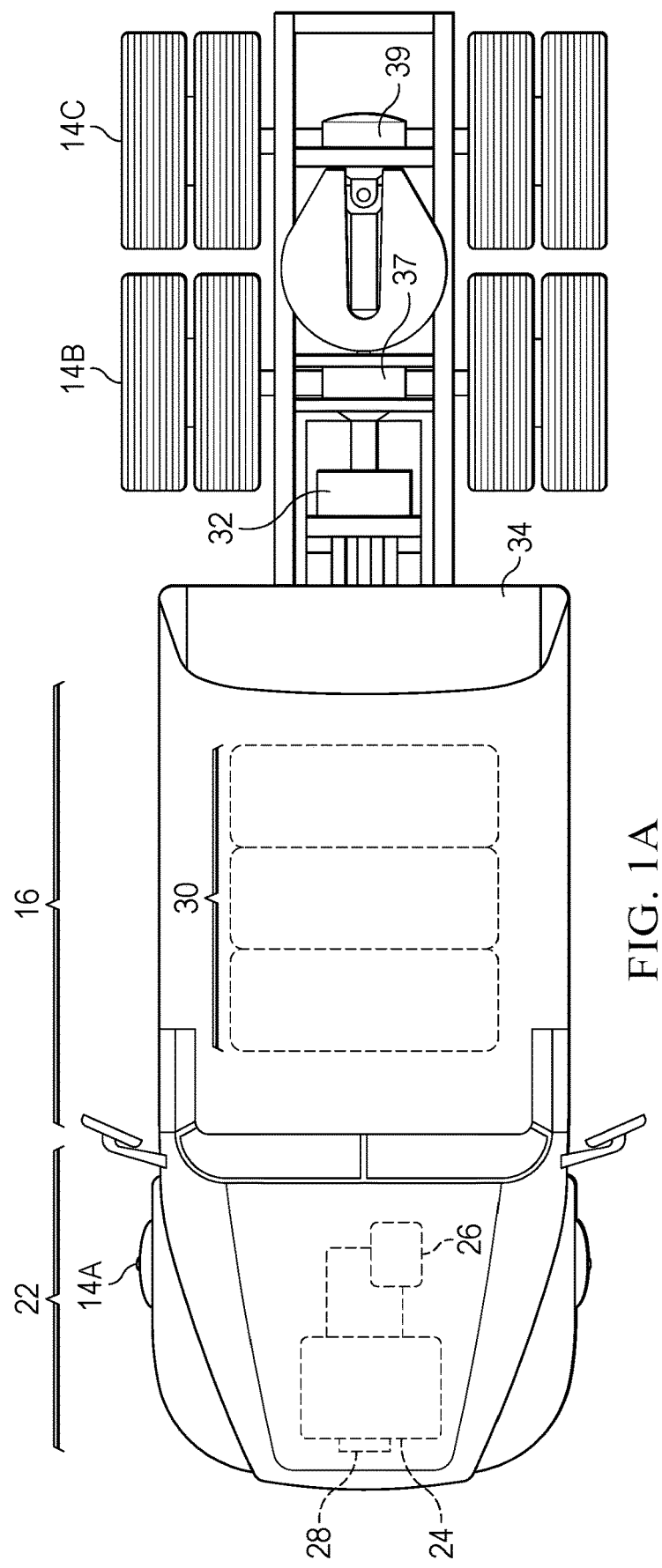
FIGS. 1A and 1B depict top and side partial views of one embodiment of a wheeled vehicle capable of transporting cargo over an extended range.
Figure 1B:
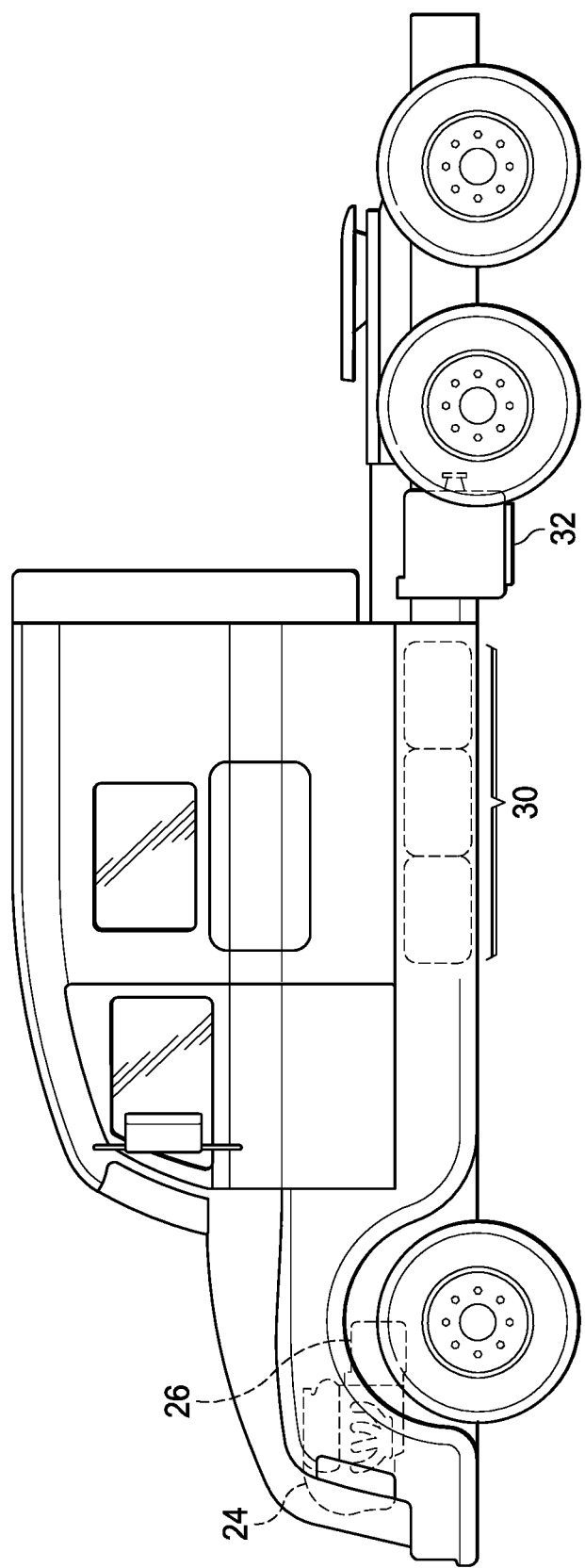

Turning now to the drawings, FIGS. 1A and 1B depict top and side partial views of a wheeled vehicle 10, such as a truck or semi-tractor used to pull one or more trailers with cargo.

As shown in FIGS. 1A and 1B, components of vehicle 10 may include, but are not limited to, chassis 12, which may support multiple axles 14, cab 16, engine compartment 22 containing engine 24 and generator 26, an array of batteries 30 and motor/generator 32 coupled to at least one axle 14. Vehicle 10 may further include rear pack 34 containing fuel tanks (not shown) for engine 24 or other equipment.

Chassis 12 may be formed with two frame members such as C-channels arranged parallel to each other. Axles 14 coupled to chassis 12 may include front axle 14A located under engine compartment 22 and rear axles 14B and 14C located behind cab 16.

Engine compartment 22 includes mounts (not shown) for supporting engine 24 and generator 26. During operation, generator 26 receives rotational power from engine 24 to generate electric power. Engine compartment 22 further contains radiator 28 positioned at the front of engine compartment 22 for cooling engine 24. Coolant such as glycol or some other anti-freeze liquid may be circulated through radiator 28 and engine 24 to remove heat from engine 24 and transfer the heat to the ambient air.

An array of batteries 30 may be positioned in various locations on vehicle 10. In some embodiments, batteries 30 may be located on chassis 12. In some embodiments, batteries 30 may be located between, under or around the rails of chassis 12. The array of batteries 30 may be connected in series, parallel or some combination. Electric power generated by generator 26 may be used to charge the array of batteries 30.

Motor/generator 32 may/be coupled to at least one axle 14. In some embodiments, motor/generator 32 may be integrated with axle 14 as an e-axle configuration or located in a hub of a wheel coupled to axle 14 as a hub motor/generator configuration. Embodiments of vehicle 10 may include motor/generator 32 coupled to gear boxes or differentials. For example, as depicted in FIG. 1A, motor/generator 32 may be coupled to a three-speed centralized gear box 37 with a two-speed rear differential 39 to provide six discrete gear ratios.

In some embodiments (not shown), vehicle 10 may be configured with a plurality of motor/generators 32, with a motor/generator 32 coupled to each wheel or pair of wheels.

Behind cab 16, rear pack 34 may be configured to hold one or more fuel tanks 36 for use by engine 24.

Figure 2:
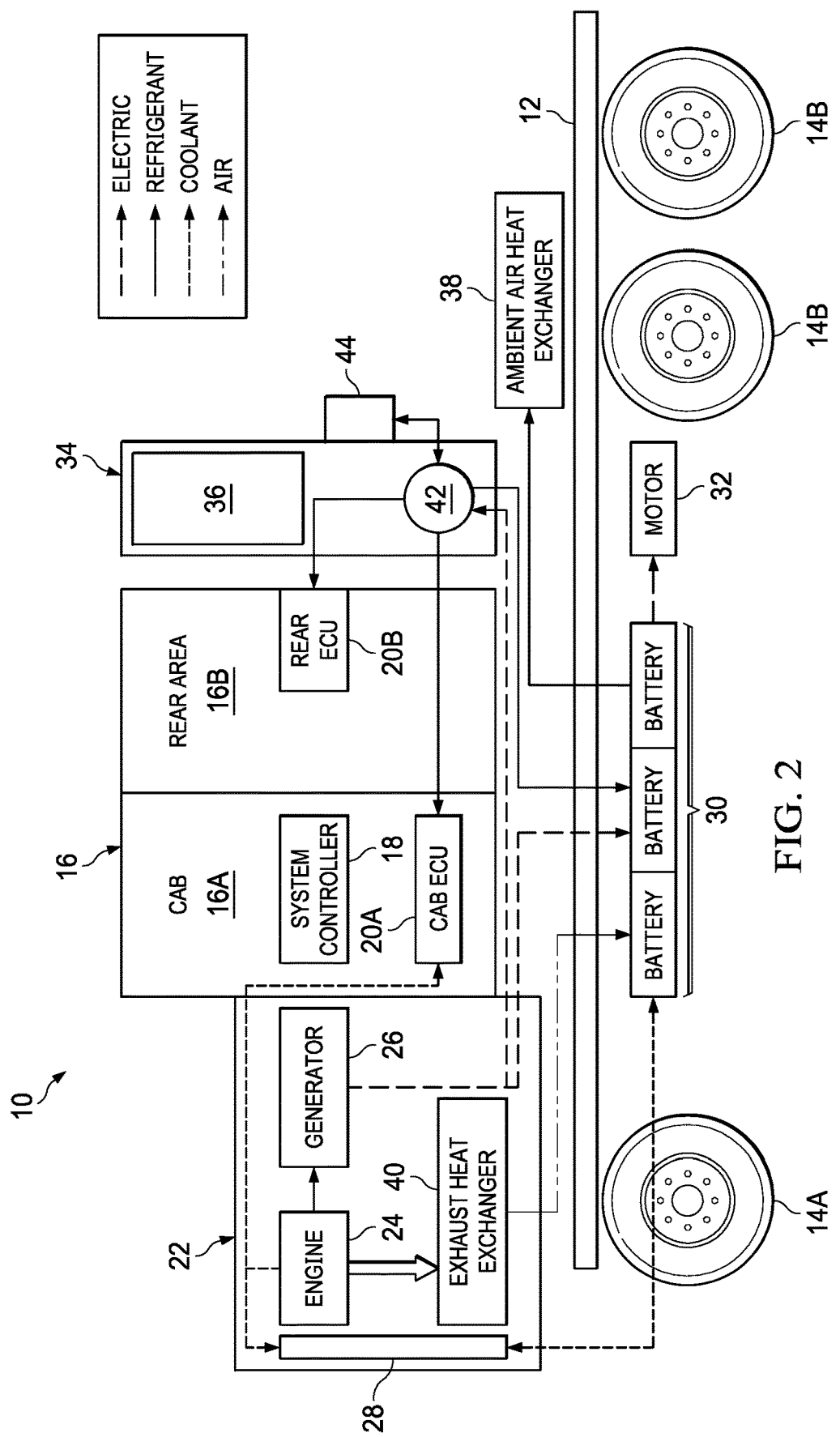
FIG. 2 depicts a schematic diagram of one embodiment of the vehicle depicted in FIGS. 1A and 1B.

Turning to FIG. 2, cab 16 includes system controller 18 for monitoring systems on vehicle 10 and one or more environmental control units (ECU) 20 having air conditioning and heating options. As depicted in FIG. 2, front area 16A may have a ECU 20A for managing cab temperatures and rear area 16B may have secondary ECU 20B for managing rear area temperatures. ECUs 20A, 20B may be fluidly coupled to compressor 42 and refrigerant heat exchanger 44 as part of an air conditioning system for cab 16 and thermal management system for batteries 30, discussed in greater detail below.

Engine compartment 22 contains engine 24 and a coolant system including radiator 28 for cooling engine 24, wherein coolant may flow through engine 24 and radiator 28 to remove heat from engine 24 to the ambient air.

Vehicle 10 may further include ambient air heat exchanger 38 for heat exchange between batteries 30 and the ambient air, exhaust heat exchanger 40 for extracting heat from exhaust gases to heat batteries 30.

Vehicle Configuration is Agnostic to Engine

Vehicle 10 may be configured with engine 24 coupled only to generator 26 such that engine 24 is used to generate electric power only. In these embodiments, vehicle 10 may be agnostic to engine 24 such that engine 24 may be a conventional type of engine such as an internal combustion (IC) engine (also referred to as an ICE) that may be configured to operate using gasoline, diesel, natural gas (NG) including compressed natural gas (CNG), liquid natural gas (LNG) and renewable natural gas (RNG), or other types of engine including, but not limited to gas turbines and fuel cells, which may operate on hydrogen, natural gas, propane or some other fuel source. The selection of which engine 24 to install on vehicle 10 may be based on a fuel type.

Ease of Installation, Servicing and Removal of Engine

Vehicle 10 configured with engine 24 may be coupled only to generator 26 may facilitate installation of high density engines 24 with smaller displacements. For example, embodiments may utilize a conventional diesel engine with a displacement between 6-12 liters instead of a 15 liter displacement. A smaller engine 24 may be configured to operate at higher engine speeds for greater burn efficiency and generate more heat per volume of air.

Decontented Engine

In some embodiments, vehicle 10 may be configured with a decontented engine 24, whereby engine 24 may be mechanically coupled only to generator 26 and any power needed by accessories comprises electrical power drawn from batteries 30 or generated by generator 26. In some embodiments, engine 24 may be decontented such that engine 24 is mechanically coupled only to generator 26 and any power needed by all components including a water pump and any accessories comprises electrical power drawn from batteries 30 or generated by generator 26. By way of background, in a traditional drivetrain for vehicle, an ICE is mechanically coupled to a water pump and the ICE is further coupled to accessories via a belt. The accessories may include an air conditioning (A/C) compressor, an alternator, a power steering pump and an air compressor. Thus, the ICE in a traditional drivetrain needs to be large enough to propel the vehicle and provide rotational power to the water pump and all accessories associated with the belt. The additional power demands result in the ICE being engineered to operate over a wide range of operating speeds and loads, adding cost and complexity.

In some embodiments, vehicle 10 may be configured with engine 24 coupled to generator 26 such that generator 26 replaces the alternator and power generated by generator 26 operates a water pump and any accessories. Using this arrangement, the displacement and overall size associated with engine 24 may be reduced and components and accessories may be located elsewhere in engine compartment 22 or elsewhere on chassis 12 of vehicle 10. Furthermore, engine 24 coupled to only generator 26 and configured to provide rotational power only to generator 26 may be able to operate within a preferred or optimal operating range. In some embodiments, a decontented engine 24 coupled to only generator 26 may be easier to start using batteries 30 providing electric power to generator 26 such that generator 26 performs the functionality usually associated with a starter motor/generator. Elimination of a starter motor/generator may further reduce the overall size associated with engine 24 and may simplify installation and removal of engine 24 from engine compartment 22.

Reduced Load on Engine

Embodiments of vehicle 10 utilizing engine 24 vehicle 10 configured with engine 24 coupled only to generator 26 such that engine 24 is used to generate electric power only may allow engine 24 to operate within a preferred operating range. Generator 26 coupled to engine 24 may be sized based on an operating range of engine 24. For example, a turbine engine 24 may have an operating range of 40,000-120,000 RPM and generator 26 may be sized to generate electric power efficiently for that operating range. As another example, vehicle 10 may be outfitted with a diesel engine 24 having a preferred operating range of 1200-2400 RPM and generator 26 may be sized to generate electric power efficiently for that operating range. The ability to operate engine 24 within a preferred operating range may increase the efficiency and/or service life of engine 24. In some embodiments, vehicle 10 may use a decontented engine 24 with a lower rating or durability by operating engine 24 within a smaller operating range. For example, the diesel engine 24 mentioned above may have an operating range of 800-6000 RPM, a preferred operating range of 1200-2400 RPM and an optimal operating range of 1500-1800 RPM.

Vehicle Configurable for Different Modes of Operation

Embodiments of vehicle 10 configured with all components and subsystems capable of drawing power from an array of batteries 30 allows vehicle 10 to operate in different modes. For example, in a normal (driving) mode, vehicle 10 may be moving and engine 24 may be turned on or off as needed to generate power to charge batteries 30 or supply electric power directly to motor/generator 32. In an auxiliary power unit (APU) mode, engine 24 may be turned off and power may be drawn from batteries 30. APU mode may be used to supply power to a trailer for refrigeration of contents in the trailer or to operate a pump on the trailer. APU mode may be available when vehicle 10 is not moving, such as when a driver is tired or is required to pull over and rest. In some embodiments, engine 24 may generate electric power to support power take-off (PTO) needs and batteries 30 may supply power to support PTO needs or some other need. In some embodiments, engine 24 comprises a mechanical PTO and system controller 18 may operate engine 24 in a preferred range of operation and use excess power to charge batteries 30. In an emergency operation (EO) mode, vehicle 10 may or may not be moving and engine 24 may generate electric power for use on systems outside of vehicle 10 or systems may operate off battery power in APU mode or PTO mode. In some embodiments, vehicle 10 may be coupled with a trailer configured with a secondary battery compartment for additional driving range or extended operation in one or more of APU mode, PTO mode or EO mode. In some embodiments, a charging port for batteries 30 may be used to couple an external battery pack to vehicle 10 for additional driving range or extended operation.

Battery Management System

A battery management system facilitates vehicle 10 operating under a range of environmental, economic and regulatory conditions. A battery management system (BMS) may control when charging can occur and may communicate with a driver when to plug in to a charging port, when to operate engine 24 and when to operate using batteries 30.

In some embodiments, vehicle 10 configured with a BMS may anticipate future power needs and operate engine 24 to charge batteries 30 or adjust an operating temperature of batteries 30, discussed below in more detail.

In some embodiments, system controller 18 may determine a weight of vehicle 10. Determining a weight of vehicle 10 may include system controller 18 performing one or more of: determining if a trailer is coupled to vehicle 10, receiving an input from a driver or communicating over a network with a weigh station or other external source to receive a vehicle weight. Determining a weight of vehicle 10 may also include system controller 18 indirectly determining the weight, such as by determining a load on engine 24 or batteries 30, determining a fuel consumption rate by engine 24, determining a discharge rate of batteries 30, or determining a temperature increase of batteries 30. In some embodiments, system controller 18 may compare weight estimations against information input from a driver or received from a weigh station or other external source to calibrate sensors or determine when maintenance is needed.

Information associated with the weight of vehicle 10 may be used to manage the operating temperature and performance of batteries 30 and engine 24. For example, system controller 18 may determine the weight of vehicle 10 is at or near a maximum weight and calculate, based on the maximum weight, how much power is needed to move vehicle 10 on a highway at a desired speed. In some embodiments, system controller 18 may determine a weight of vehicle 10 and calculate how much energy may be regenerated using a regenerative braking system. In some embodiments, system controller 18 may determine the weight of vehicle 10, analyze the route or terrain, and determine when to charge batteries 30 or if engine 24 is needed to provide direct power to assist motor/generator 32. In some embodiments, system controller 18 may determine the weight of vehicle 10, analyze the route or terrain, and determine how much regenerative power is available to charge batteries 30 including coast down charging. In some embodiments, system controller 18 may receive an input from a driver or communicate over a network with a server to identify a route and charge batteries 30 based on the route, including terrain on the route. In some embodiments, system controller 18 analyzes topographical data and adjusts the performance, the state of charge (SOC) and the operating temperature of batteries 30 and/or the performance of engine 24 based on the topographical data.

System controller 18 may also monitor system performance to determine component performance. For example, system controller 18 may analyze power compared with vehicle speed to determine an efficiency of motor/generator 32 or engine 24. Information may be used to determine when to service vehicle 10 including engine 24, motor/generator 32, batteries 30, axles 14, a refrigerant system or a coolant system. In some embodiments, system controller 18 may determine an ambient air temperature and calculate how much power vehicle 10 will need to cool batteries 30 below a threshold level based on the ambient air temperature. Information may be stored in memory on vehicle 10 or communicated using a network to a main server for predicting maintenance needs.

Operation of Engine Based on Environmental Conditions

A battery management system (BMS) may monitor operating conditions and control when charging can occur and may communicate with a driver when to plug in to a charging port, when to operate engine 24 and when to operate using batteries 30. In some embodiments, if the ambient air temperature is below a minimum temperature such that batteries 30 perform poorly or below a minimum threshold, a BMS may configure vehicle 10 such that heat is added to batteries 30 to maintain an operating temperature of batteries 30 above a minimum temperature threshold. In some embodiments, system controller 18 may monitor the operating temperature of batteries 30 and turn on engine 24 and open a coolant system to add heat to batteries 30. In some embodiments, system controller 18 may determine vehicle 10 is in a high pollution area and operate on battery power or manage how or when engine 24 is used to charge batteries 30 based on pollution levels.

Sealed Battery Housing

To protect batteries 30 from physical damage as well as damage due to extreme temperatures, batteries 30 may be sealed in a battery compartment. The number of batteries 30 in a battery compartment may depend on a desired range of vehicle 10 using only battery power.

In some embodiments, all batteries 30 in an array of batteries 30 are contained in a single sealed case. In other embodiments, one or more batteries 30 in a set of batteries 30 are contained in a sealed case or a sealed portion of a case. A sealed case may include connections for coupling to ambient air heat exchanger 38, exhaust heat exchanger 40, a refrigerant system and a coolant system, discussed below in more detail. In some embodiments, a connection may be a quick-disconnect connection for quickly installing or removing batteries 30 when configuring or reconfiguring vehicle 10.

Thermal Management System

Referring back to FIG. 2, cab 16 may be configured with front area 16A with system controller 18 communicatively coupled to a plurality of sensors for monitoring temperatures of the set of batteries 30, exhaust gases, the ambient air, coolant and refrigerant systems on the vehicle and environmental control unit 20A having air conditioning and heating options. Cab 16 may also have a rear area 16B with a bed, a secondary environmental control unit 20B for heating or cooling rear area 16B, and a microwave, mini-refrigerator or other appliance (not shown) for allowing the driver to eat, sleep or otherwise take breaks from driving.

Figure 3:
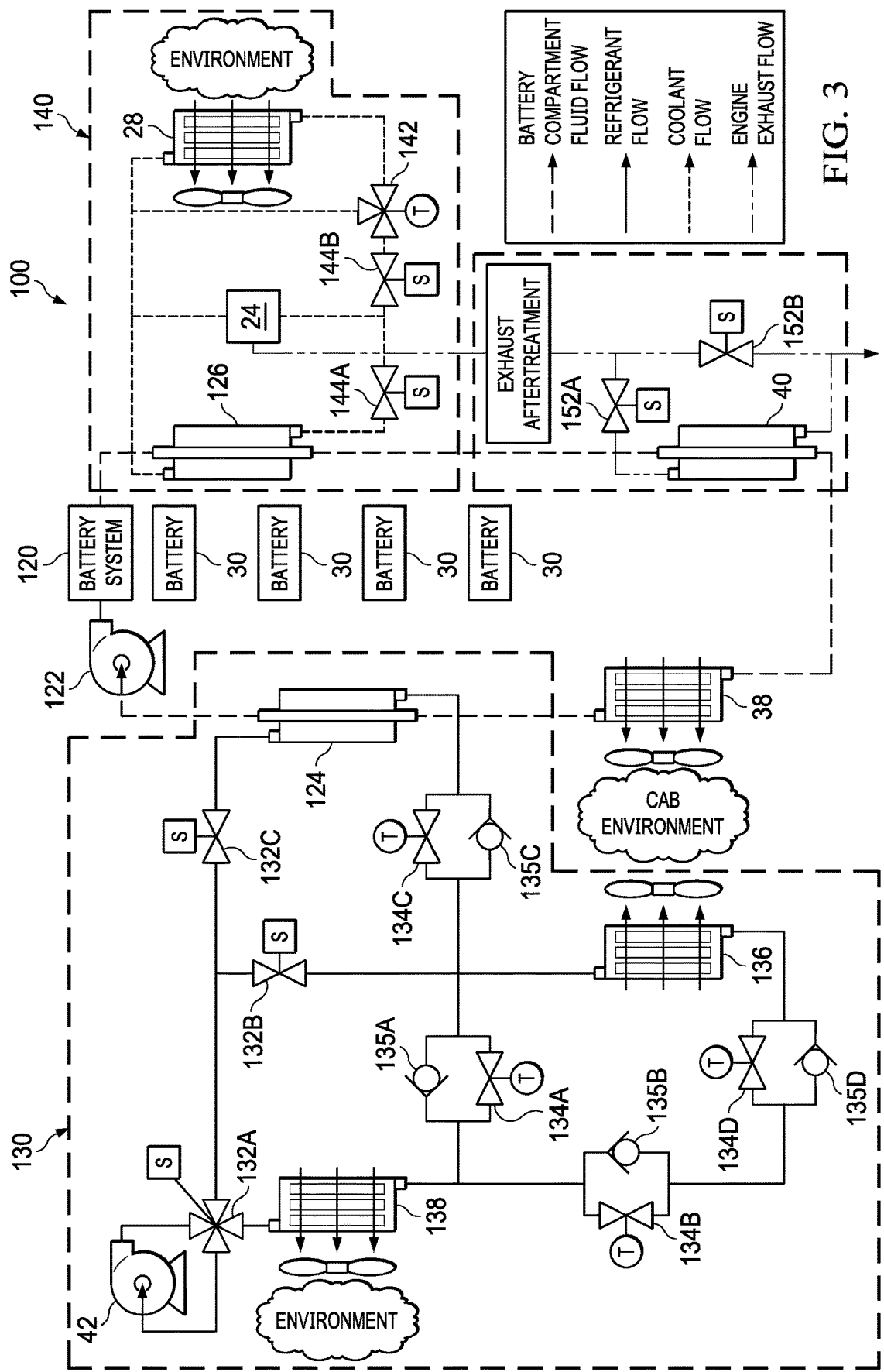
FIG. 3 depicts a schematic diagram of components of one embodiment of a thermal management system.

Referring to FIGS. 2 and 3, vehicle 10 may comprise battery system 120 comprising battery system pump 122 for circulating a fluid through a sealed compartment (not shown), ambient air heat exchanger 38 and exhaust heat exchanger 40. Battery system 120 may further include refrigerant system battery heat exchanger 124 configured for transferring heat to or from refrigerant system 130 and coolant heat exchanger 126 configured for transferring heat to or from coolant system 140. In some embodiments, generator 26 may include a generator coolant system (not shown), wherein a thermal management system may use the generator coolant system to heat or cool batteries. In some embodiments, system controller 18 may communicate over a network to receive a weather forecast and pre-heat or pre-cool cab 16 for higher efficiency of batteries 30.

Refrigerant System

Referring to FIG. 3, in some embodiments, refrigerant system 130 comprises compressor 42 in fluid communication with a plurality of valves 132A-132C for controlling the flow of refrigerant, thermal expansion valves 134A-134D for controlling phase changes in the refrigerant, cab heat exchanger 136 for transferring heat to or from cab 16 and refrigerant system external refrigerant system external heat exchanger 138 for transferring heat to or from the ambient environment.

Valve 132A may be a four-way valve to allow refrigerant system 130 to operate in a first mode to remove heat from cab 16 and/or battery system 120, a second mode to add heat to cab 16 and/or battery system 120 and a third mode to transfer heat between cab 16 and battery system 120. Thermal expansion valves 134A-134D may control phase changes in the refrigerant in a first flow direction and bypass valves 135A-135D associated with each thermal expansion valve 134A-134D may allow refrigerant to flow in an opposite direction.

Valve 132A and valves 132B-132C may be opened or closed to route refrigerant through one or more fluid loops. A first fluid loop may be configured to circulate refrigerant through refrigerant system external heat exchanger 138 and refrigerant system battery heat exchanger 124 to cool or heat batteries 30 based on ambient air conditions. A second fluid loop may be configured to circulate refrigerant through refrigerant system external heat exchanger 138 and cab heat exchanger 136 to cool cab 16 based on ambient air conditions, which may include cooling front area 16A and/or rear area 16B. A third fluid loop may be configured to circulate refrigerant through cab heat exchanger 136 and refrigerant system battery heat exchanger 124 to cool batteries 30 and heat cab 16, which may include heating front area 16A and/or rear area 16B.

Coolant System

Coolant system 140 may comprise radiator 28 in fluid communication with engine 24 for removing heat from engine 24, thermostat 142 for opening or closing a fluid loop, and valves 144A, 144B for controlling the flow of coolant in coolant system. Coolant system 140 may also include a water pump (not shown) for circulating a coolant through coolant system 140. In some embodiments, a water pump may be integrated with engine 24, with generator 26 (not shown in FIG. 3), or as a stand-alone component electrically powered by generator 26 or batteries 30.

Valves 144A-144B may be opened or closed to prevent the flow of coolant or to route coolant through one or more fluid loops. A first fluid loop may be configured to circulate coolant through engine 24 and radiator 28. A second fluid loop (not shown) may be configured to circulate coolant through engine 24 and a heat exchanger in cab 16. A third fluid loop may be configured to circulate coolant through engine 24 and heat exchanger 126.

Thermal Management System—Operation

Thermal management system 100 may be configured for cold start operation, normal operation, auxiliary power unit (APU) operation, and emergency operation (EO) of vehicle 10. Referring to FIGS. 4A-4E, thermal management system 100 for vehicle 10 may transfer heat using one or more of ambient air heat exchanger 38, exhaust heat exchanger 40, refrigerant system 130 and coolant system 140. Embodiments of thermal management system 100 may be configured to operate pump 122 to circulate fluid in a sealed compartment around batteries 30 and operate one or more valves 152A-152B associated with exhaust gas heat exchanger 40, operate compressor 42 and one or more valves 132A-132C in refrigerant system 130 and operate a water pump and one or more valves 144A-144B in coolant system 140 to manage operating temperatures of batteries 30 and engine 24 and a temperature of cab 16. In some embodiments (not shown) thermal management system 100 may include a thermo-electric circuit, wherein the thermo-electric circuit may be used to add or extract heat from batteries 30.

Under some conditions, an ambient air temperature may be extremely cold such that a temperature of batteries 30 is below a minimum operating temperature of batteries 30. Thermal management system 100 may be configured to determine an operating temperature of batteries 30 and prevent batteries 30 from operating until an operating temperature of batteries 30 is above a minimum operating temperature. In some embodiments, thermal management system 100 may include system controller 18 or some other processor configured to execute a set of instructions to prevent batteries 30 from operating at temperatures below a minimum operating temperature.

In colder operation conditions, thermal management system 100 may monitor an operating temperature of each battery 30 in an array of batteries or monitor a collective temperature of an array of batteries 30. For example, in some embodiments, a battery compartment may contain an array of batteries 30 submerged in a fluid and a sensor may detect a temperature of the fluid as an indication of the operating temperature of all batteries 30 in the compartment.

Warming Batteries Using Thermo-Electric Circuit

Figure 5:
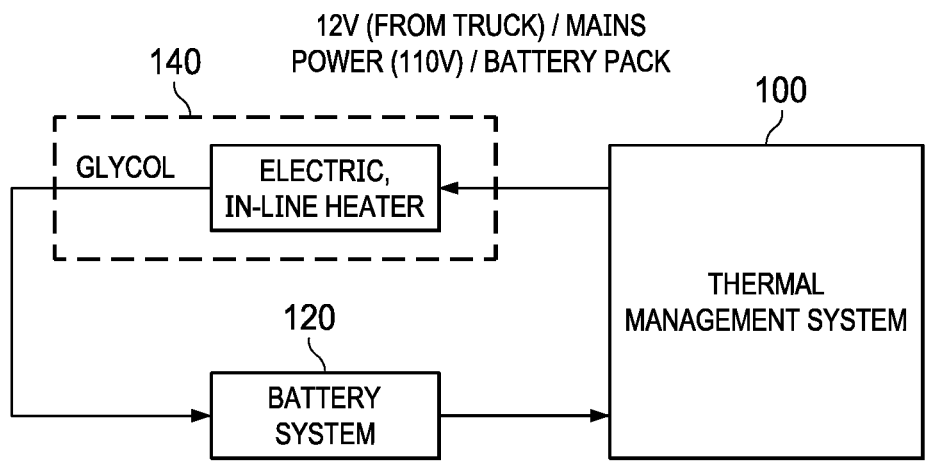
FIG. 5 depicts a block diagram of a thermal management system communicatively coupled to an electric, inline heater for heating a fluid to add heat to battery system.
Figure 6:
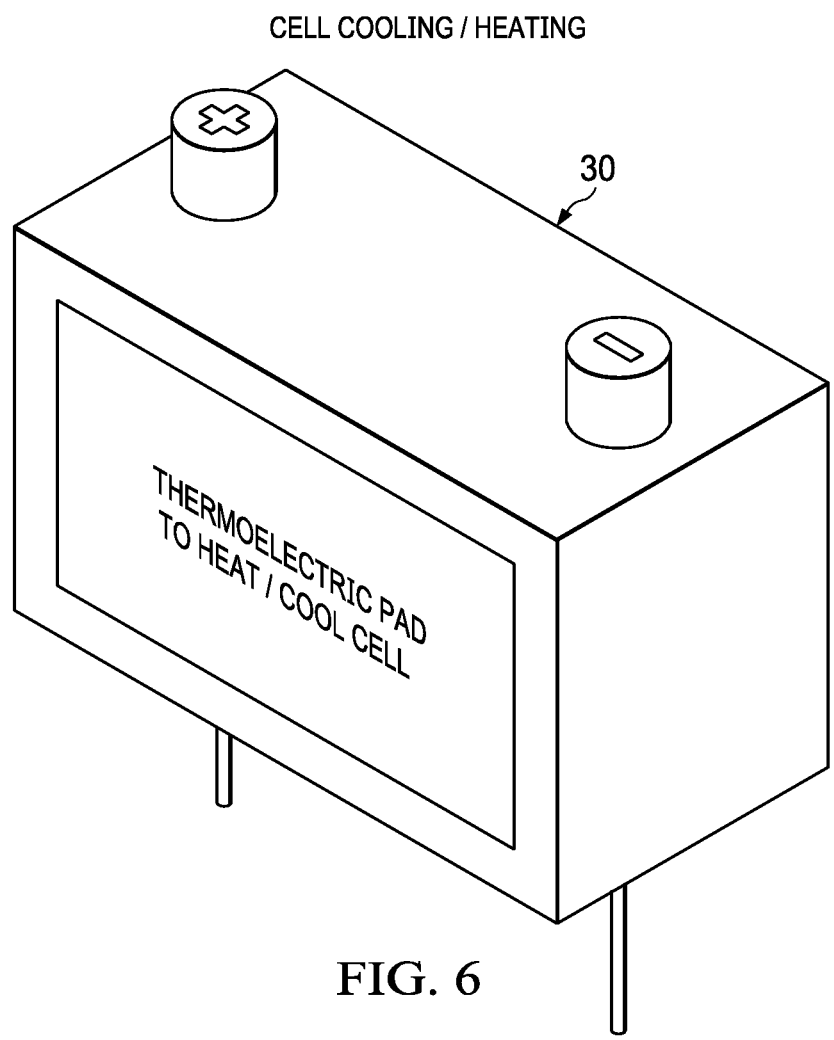
FIG. 6 depicts a perspective view of a battery with a thermoelectric pad coupled to the battery for adding or removing heat relative to the battery.

If thermal management system 100 determines an operating temperature of a first battery 30 or a set of batteries 30 in a first compartment is below a minimum operating temperature, thermal management system 100 may operate a thermo-electric circuit using battery power from a second battery 30 or set of batteries 30 in a second compartment to warm the first battery 30 or a set of batteries 30. Using battery power to warm batteries 30 may be useful in APU mode, PTO mode of EO mode. FIG. 5 depicts one embodiment of an in-line electric heater for heating coolant fluid flowing through coolant system 140. FIG. 6 depicts one embodiment of a thermoelectric pad coupled to battery 30 for directly heating or cooling battery 30.

Under some conditions, ambient air conditions may be cold enough for embodiments to cool batteries 30 but too cold for the driver's comfort. For example, the ambient air temperature may be cold and vehicle 10 may be operating without a trailer attached. In these conditions, fluid circulating through ambient air heat exchanger 38 may remove heat from a set of batteries 30 and add the heat to warm cab 16 or remove heat from cab 16 and add heat to the set of batteries. In some embodiments, thermal management system 100 may operate pump 122 to circulate fluid through ambient air heat exchanger 38 to cool batteries 30 and warm cab 16. In some embodiments, ambient air heat exchanger 38 may be configured to allow heat transfer to or from the ambient air.

Warming Batteries Using Exhaust Gases from Power Source

Thermal management system 100 may open or close loops to extract heat from exhaust gases for warming batteries 30 to a preferred operating temperature before allowing batteries 30 to operate. Under some conditions, an ambient air temperature may be extremely cold such that a temperature of batteries 30 is below a minimum operating temperature of batteries 30. Thermal management system may include system controller 18 or some other processor configured to execute a set of instructions to operate engine 24 and extract heat from one or more of the exhaust gases of engine 24, a coolant flowing through coolant system 140, refrigerant flowing through refrigerant system 130 or a thermo-electric circuit to heat batteries 30.

In some embodiments, thermal management system 100 opens or closes fluid loops to extract heat from exhaust gases for warming batteries 30 to a preferred operating temperature. System controller 18 may determine an operating temperature of batteries 30 is cooler than a minimum operating temperature, determine that an ambient air temperature is too low to effectively heat batteries 30 using ambient air heat exchanger 38, and may determine the temperature of exhaust gases may efficiently heat batteries 30. Referring to one or more of FIGS. 4A and 4B, system controller 18 may open valve 152A and close valve 152B. As exhaust gases exit engine 24, the exhaust gases are routed through exhaust gas heat exchanger 40 to transfer heat to batteries 30. If batteries are above a minimum operating temperature, system controller 18 may close valve 152A and open valve 152B (as depicted in one or more of FIGS. 4C-4E) to route exhaust gases through exhaust gas system to the ambient environment.

Warming Batteries Using Coolant System from Power Source

Figure 4A:
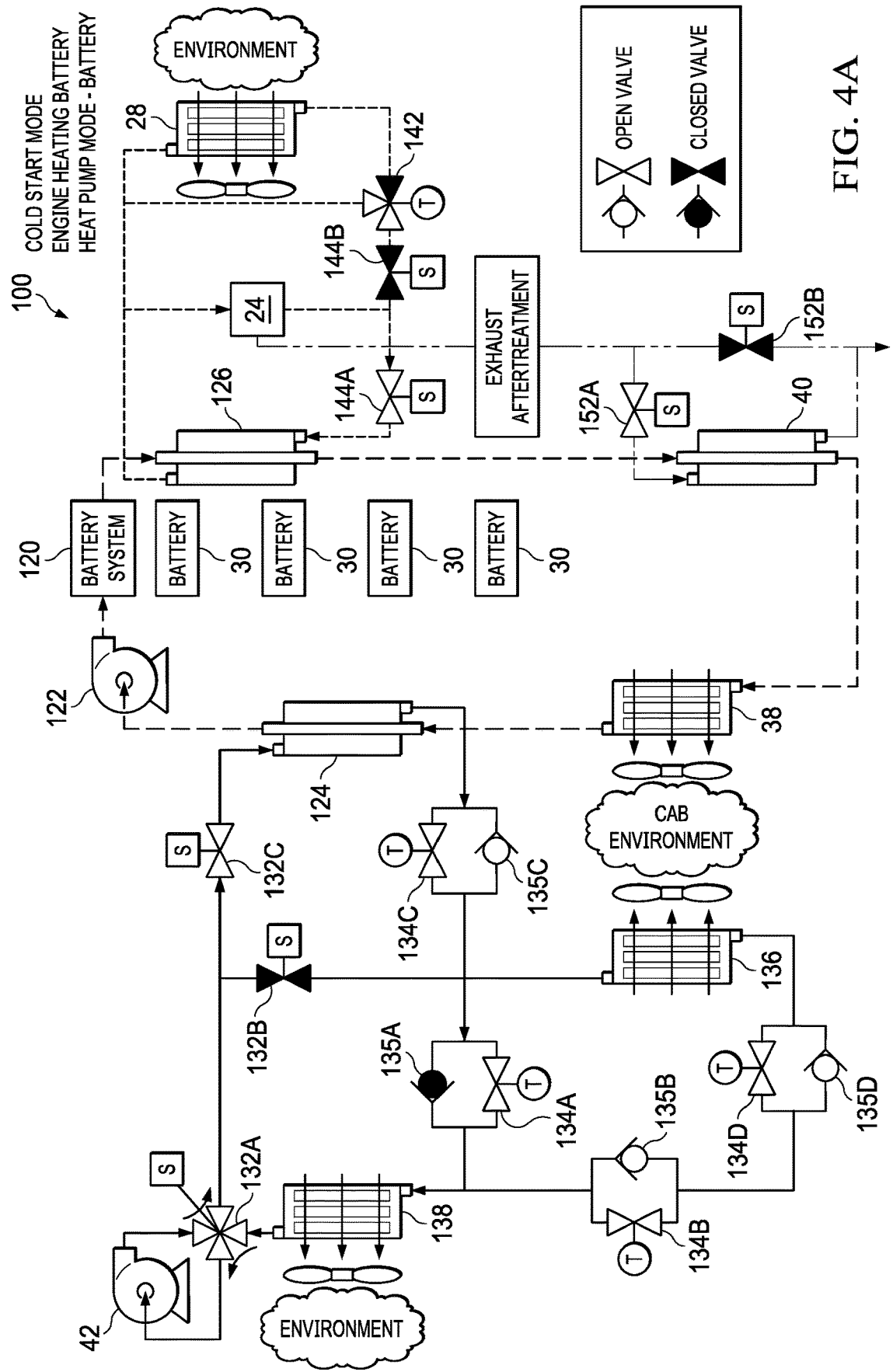
FIGS. 4A-4E depict configurations of the thermal management system of FIG. 3.
Figure 4B:
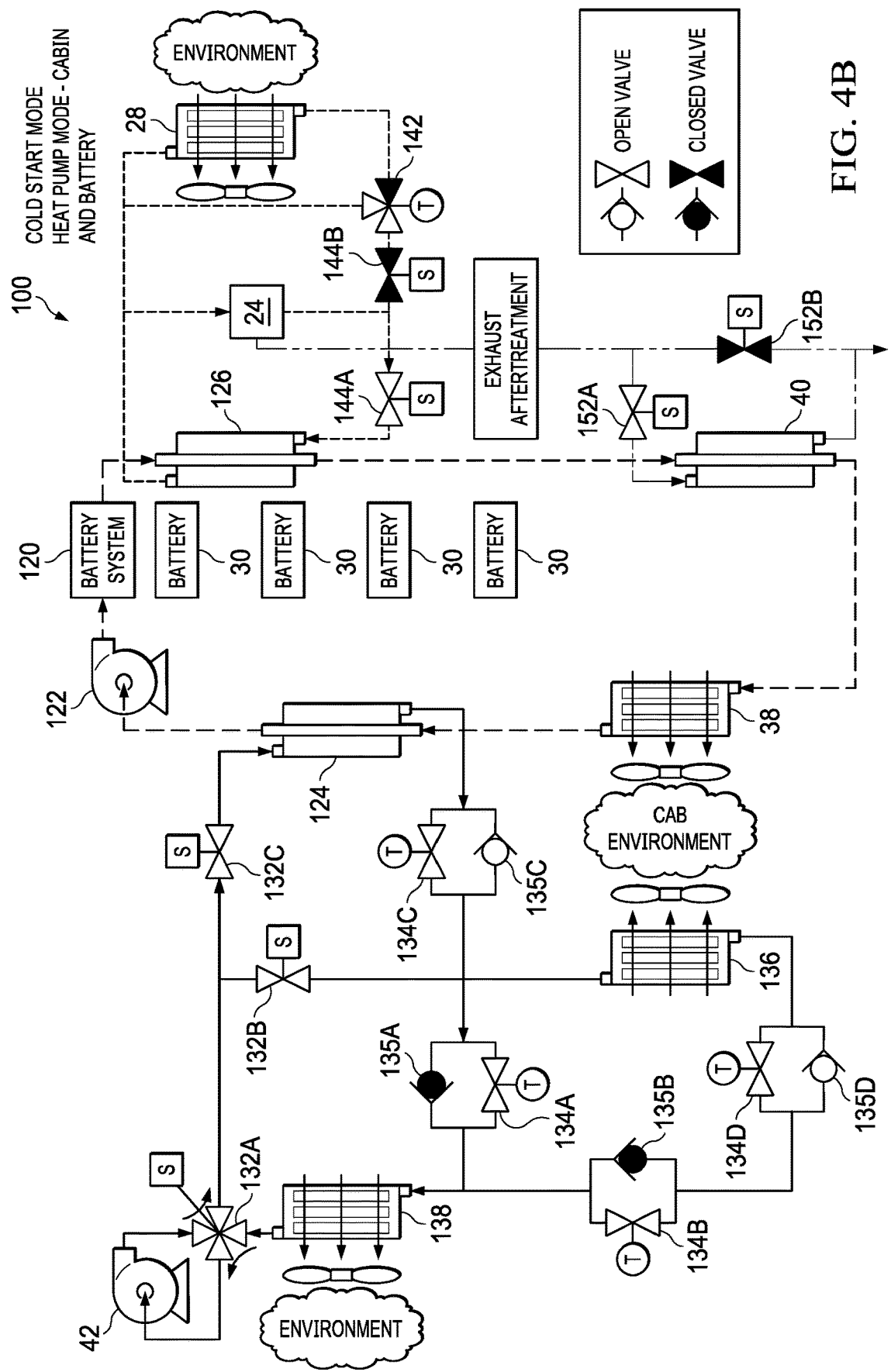
Figure 4C:
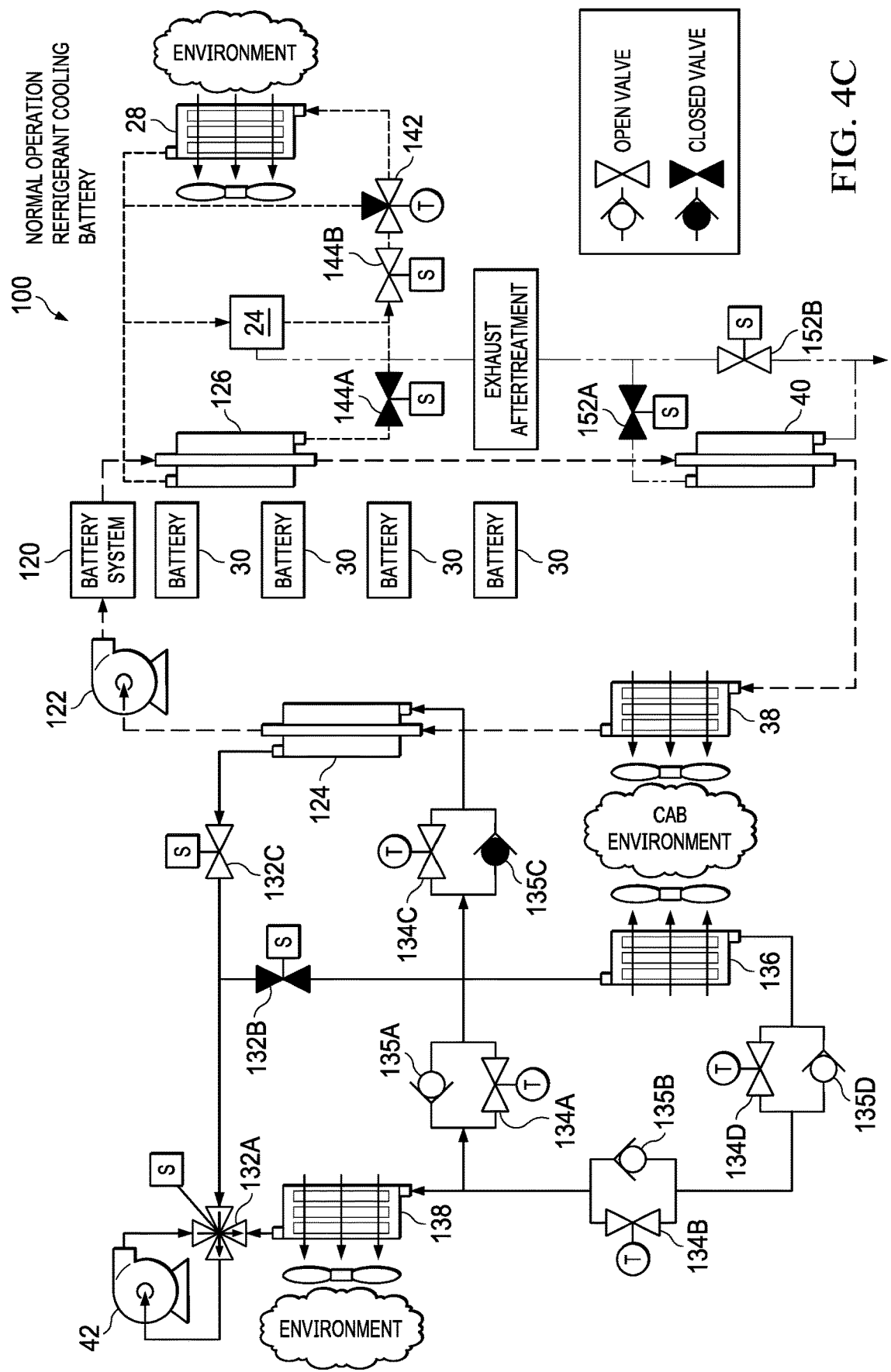
Figure 4D:
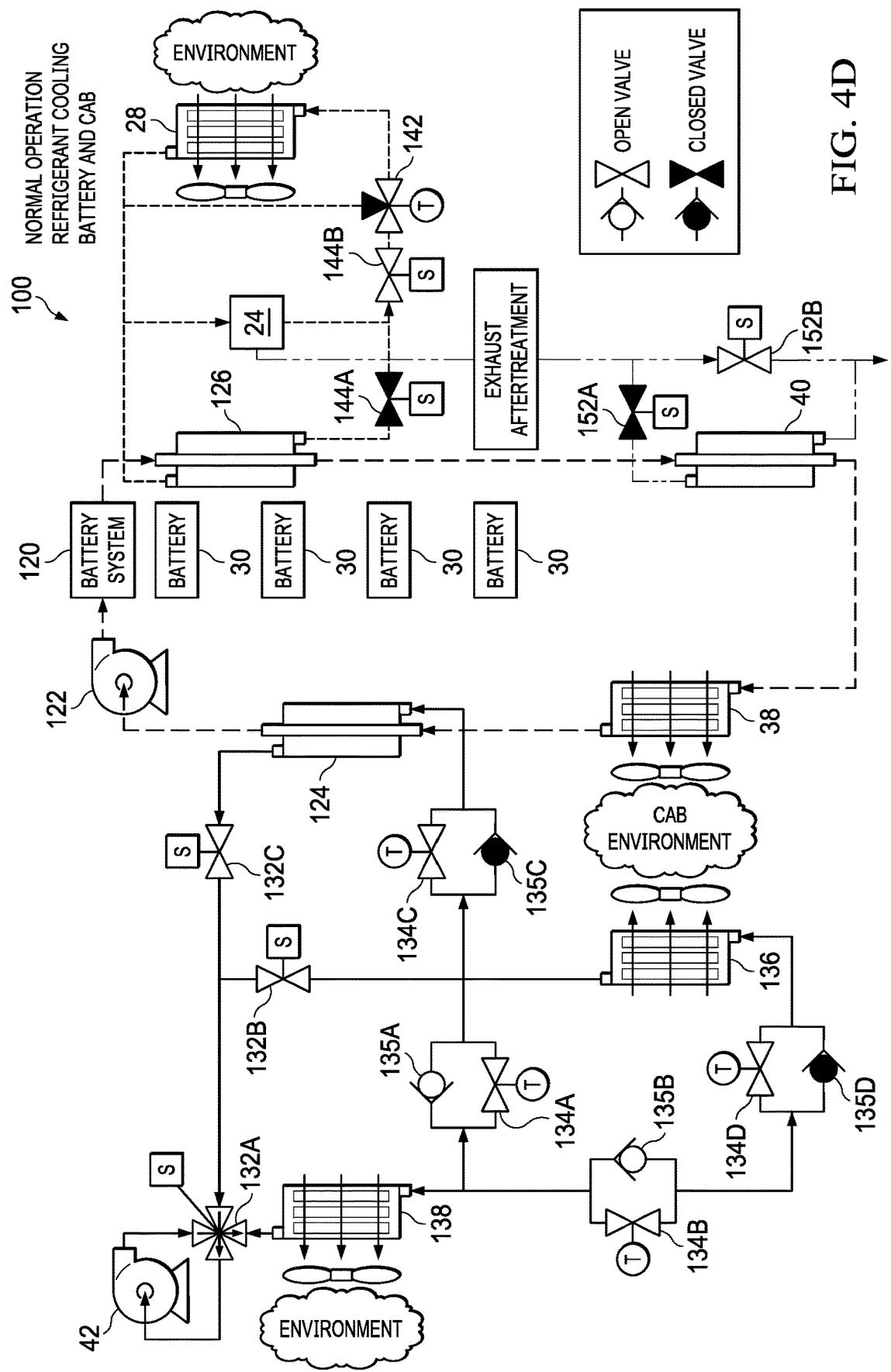
Figure 4E:
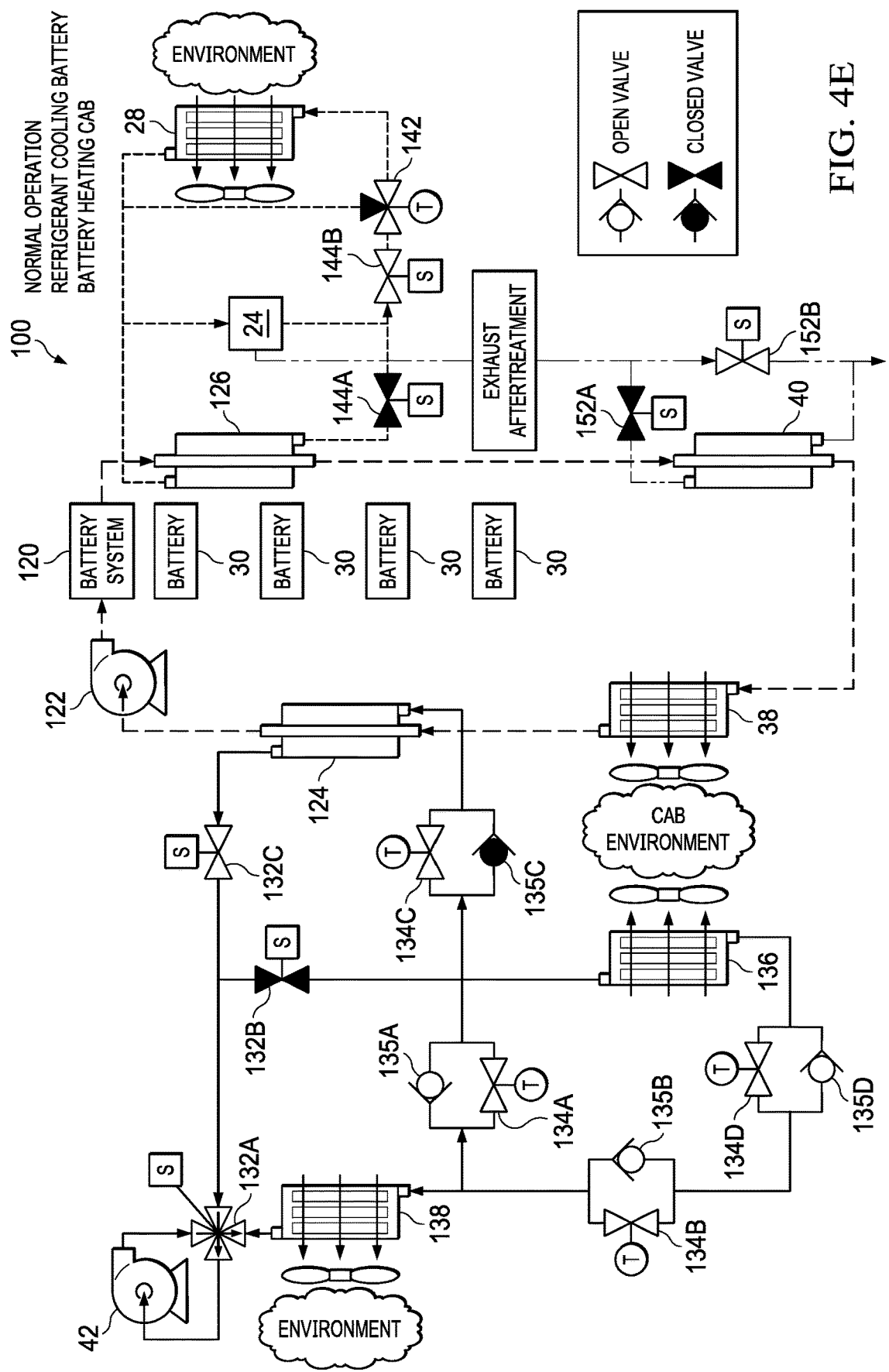

Thermal management system 100 may open or close loops to extract heat from coolant system 140 for warming batteries 30 to a preferred operating temperature before allowing batteries 30 to operate. Under some conditions, thermal management system 100 may open or close fluid loops in coolant system 140 to extract heat from engine 24 for warming batteries 30 to a preferred operating temperature. System controller 18 may determine an operating temperature of batteries 30 is cooler than a minimum operating temperature, determine that an ambient air temperature is too low to effectively heat batteries 30, and may determine the temperature of coolant may efficiently heat batteries 30. As depicted in FIGS. 4A and 4B, system controller 18 may open valve 144A and close valve 144B to route coolant through coolant system battery heat exchanger 126 to transfer heat to batteries 30. As depicted in FIGS. 4C-4E, if batteries are above a minimum operating temperature, system controller 18 may close valve 144A and open valve 152B to route coolant through radiator 28.

Under some conditions, thermal management system 100 may open or close fluid loops in refrigerant system 130 to extract heat from cab 16 or the ambient environment for warming batteries 30 to a preferred operating temperature. System controller 18 may determine an operating temperature of batteries 30 is cooler than a minimum operating temperature and may operate components of refrigerant system 130 to extract heat from the ambient environment and cab 16 to heat batteries 30. As depicted in FIGS. 4A and 4B, system controller 18 may open valve 132C, 132 and close valve 144B to route coolant through coolant system battery heat exchanger 126 to transfer heat to batteries 30. As depicted in FIGS. 4C-4E, if batteries are above a minimum operating temperature, system controller 18 may close valve 144A and open valve 152B to route coolant through radiator 28.

Under some conditions, thermal management system 100 opens or closes a fluid loop in a thermo-electric circuit to add or extract heat from warming batteries 30 to maintain the operating temperature of batteries 30 within a range of preferred operating temperatures.

Warming Batteries Using Refrigerant System

Thermal management system 100 may open or close loops to extract heat from refrigerant system 130 for warming batteries 30 to a preferred operating temperature before allowing batteries 30 to operate. In some embodiments, system controller 18 may determine an operating temperature of batteries 30 is below a minimum operating temperature, determine that an ambient air temperature is too cold to effectively heat batteries 30 using ambient air heat exchanger 38, and may determine refrigerant system 130 is already operating to heat cab 16.

System controller may configure valve 132A to allow refrigerant to flow through refrigerant system 130 in a first direction and operate compressor 42 to pump refrigerant through valve 132C and heat exchanger 124 to extract heat from batteries 30. Refrigerant may flow through thermal expansion valve 134C and heat exchanger 136 to transfer some heat to cab 16, and may flow through thermal expansion valve 134D, bypass 135B and heat exchanger 138 to extract heat from batteries 30 to the ambient air.

Thermal management system 100 may use a thermo-electric circuit, ambient air heat exchanger 38, exhaust gas heat exchanger 40 one or more loops of coolant system 140 and refrigeration system 130 to warm batteries 30 to a desired operating temperature or warm cab 16 to a desired temperature for the driver.

Cold Start Mode—Battery Heating Only

Under some conditions, engine 24 is cold and batteries 30 are below a desired operating temperature. In some embodiments, thermal management system 100 determines an operating temperature of batteries 30 is below a minimum operating temperature and the ambient air temperature is too low to effectively heat batteries 30. Thermal management system 100 may prevent operation of batteries 30 and use engine 24 to heat batteries 30 in a cold start mode.

In some embodiments, when system controller 18 sends a signal that vehicle 10 is being started, thermal management system 100 may be configured to allow a battery 30 to start engine 24 only. Once started, engine 24 may provide rotational power to generator 26 to provide electric power to open and close valves 152A, 152B associated with exhaust air heat exchanger 40 and configure one or more loops in coolant system 140 and refrigerant system 130 to warm batteries 30 to a minimum operating temperature.

In some embodiments, system controller 18 may determine one or more of exhaust gas heat exchanger 40, coolant system 140 or refrigerant system 130 operating as a heat pump may efficiently warm batteries 30.

Referring to FIG. 4A, when engine 24 starts, system controller 18 may open valve 152A and close valve 152B to route exhaust gases through exhaust heat exchanger 40 to transfer heat to batteries 30. Initially, thermostat 142 may prevent coolant flow through radiator 28 to allow engine 24 to warm to a desired operating temperature. In some embodiments, system controller 18 may configure coolant system 140 to use a first loop in which valve 144A is open and valve 144B is closed, which routes coolant through heat exchanger 126 to transfer heat to batteries 30. In some embodiments, system controller 18 may operate compressor 42 and configure valve 132A to allow fluid flow in a first direction to use refrigerant system 130 as a heat pump. System controller 18 may open valve 132C to allow refrigerant to flow through heat exchanger 124 to heat batteries 30 and close valve 132B to prevent refrigerant to flow through heat exchanger 136. Refrigerant may flow through thermal expansion valves 135C and 135A and heat exchanger 138 to extract heat from ambient air to warm batteries 30.

As the operating temperature of batteries 30 approach a minimum operating temperature, system controller 18 may close valve 144A and open valve 144B to route coolant through radiator 28 to extract heat to the ambient environment, close valve 152A and open valve 152B to route exhaust gases through exhaust treatment systems, turn off compressor 42 to stop operation of refrigerant system 130 or close valve 132C and open valve 132B to route refrigerant through heat exchanger 136.

Cold Start Mode—Battery and Cab Heating

Under some conditions, engine 24 is cold and batteries 30 are below a desired operating temperature and the temperature in cab 16 is cold. In some embodiments, thermal management system 100 determines an operating temperature of batteries 30 is below a minimum operating temperature, the temperature of cab 16 is cold and the ambient air temperature is too low to effectively heat batteries 30 or cab 16. Thermal management system 100 may prevent operation of batteries 30 and use engine 24 to heat batteries 30 in a cold start mode.

In some embodiments, when system controller 18 sends a signal that vehicle 10 is being started, thermal management system 100 may be configured to allow a battery 30 to start engine 24 only. Once started, engine 24 may provide rotational power to generator 26 to provide electric power to open and close valves 152A, 152B associated with exhaust air heat exchanger 40 and configure one or more loops in coolant system 140 and refrigerant system 130 to warm batteries 30 to a minimum operating temperature and heat cab 16.

In some embodiments, system controller 18 may determine one or more of exhaust gas heat exchanger 40, coolant system 140 or refrigerant system 130 operating as a heat pump may efficiently warm batteries 30 and heat cab 16.

Referring to FIG. 4B, when engine 24 starts, system controller 18 may open valve 152A and close valve 152B to route exhaust gases through exhaust heat exchanger 40 to transfer heat to batteries 30. Initially, thermostat 142 may prevent coolant flow through radiator 28 to allow engine 24 to warm to a desired operating temperature. In some embodiments, system controller 18 may configure coolant system 140 to use a first loop in which valve 144A is open and valve 144B is closed, which routes coolant through heat exchanger 126 to transfer heat to batteries 30. In some embodiments, system controller 18 may operate compressor 42 and configure valve 132A to allow fluid flow in a first direction to use refrigerant system 130 as a heat pump. System controller 18 may open valve 132C to configure a first loop of refrigerant system 130 in which refrigerant flows through heat exchanger 124 to transfer heat to batteries 30 and flows through thermal expansion valves 134C and 134C to heat exchanger 138 to extract heat from ambient air. System controller 18 may open valve 132B to configure a second loop of refrigerant system 130 in which refrigerant flows through heat exchanger 136 to transfer heat to cab 16 and flows through thermal expansion valves 134D and 134B to heat exchanger 138 to extract heat from ambient air.

Although not depicted in FIG. 9B, thermal management system 100 may configure a second loop of coolant system 140 in which a valve is opened to route coolant to a heat exchanger associated with cab 16, wherein heat generated by engine 24 may be used to heat cab 16.

As the operating temperature of batteries 30 approach a minimum operating temperature, system controller 18 may close valve 144A and open valve 144B to route coolant through radiator 28 to extract heat to the ambient environment, close valve 152A and open valve 152B to route exhaust gases through exhaust treatment systems, or close valve 132C but keep valve 132B open to route refrigerant through heat exchanger 136.

Normal Operation

Under normal operation, the operating temperature of batteries 30 may increase. To prevent the operating temperature of batteries 30 from exceeding a maximum operating temperature, embodiments of thermal management system 100 may close valve 152A associated with exhaust air heat exchanger 40 and configure one or more loops in coolant system 140 and refrigerant system 130 to maintain the operating temperature of batteries 30 within a range of operating temperatures. Under normal operation, engine 24 may be on to charge batteries 30, drive vehicle 10 or operate components on vehicle 10 such that engine 24 is actively generating heat, or engine 24 may be turned off but still require cooling. Similarly, batteries 30 may be supplying power to drive vehicle 10 or operate components on vehicle 10 such that batteries 30 are generating heat, or batteries 30 may be inactive but still require cooling. Normal operation may include operating in auxiliary power unit (APU) mode, power take-off (PTO) mode and emergency operation (EO) mode.

Referring to FIG. 4C, system controller 18 may operate compressor 42 and configure valve 132A to allow fluid flow in a second direction to use refrigerant system 130 to extract heat from batteries 30. System controller 18 may open valve 132C to configure a loop of refrigerant system 130 in which refrigerant flows through heat exchanger 138 to transfer heat to the ambient air and flows through thermal expansion valves 134A and 134C to heat exchanger 124 to extract heat from batteries 30. System controller 18 may close valve 144A of coolant system 140 to prevent coolant from heating batteries 30. If engine 24 is operating, system controller 18 may close valve 152A and open valve 152B to route exhaust gases through exhaust heat exchanger 40 to transfer heat to batteries 30.

Referring to FIG. 4D, system controller 18 may operate compressor 42 and configure valve 132A to allow fluid flow in a second direction to use refrigerant system 130 to extract heat from batteries 30 and provide air condition to cab 16. System controller 18 may open valve 132C to configure a first loop of refrigerant system 130 in which refrigerant flows through heat exchanger 138 to transfer heat to the ambient air and flows through thermal expansion valves 134A and 134C to heat exchanger 124 to extract heat from batteries 30. System controller 18 may open valve 132B to configure a second loop of refrigerant system 130 in which refrigerant flows through heat exchanger 138 to transfer heat to the ambient air and flows through thermal expansion valves 134B and 134D to heat exchanger 136 to extract heat from cab 16. System controller 18 may close valve 144A of coolant system 140 to prevent coolant from heating batteries 30. If engine 24 is operating, system controller 18 may close valve 152A and open valve 152B to route exhaust gases through exhaust heat exchanger 40 to transfer heat to batteries 30.

Referring to FIG. 4E, system controller 18 may operate compressor 42 and configure valve 132A to allow fluid flow in a second direction to use refrigerant system 130 to extract heat from batteries 30 but add heat to cab 16. System controller 18 may open valve 132C to configure a loop of refrigerant system 130 in which refrigerant flows through heat exchanger 138 to transfer heat to the ambient air and flows through thermal expansion valves 134A and 134C to heat exchanger 124 to extract heat from batteries 30. System controller 18 may open valve 132B to configure a second loop of refrigerant system 130 in which refrigerant flows through heat exchanger 138 to transfer heat to the ambient air. Refrigerant flows through thermal expansion valves 134B and 134D to heat exchanger 136 to add heat to cab 16 and flows through thermal expansion valves 134A and 134C to heat exchanger 124 to extract heat from batteries 30.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed:

1. A thermal management system comprising:
a refrigerant system battery heat exchanger;
a refrigerant system in fluid communication with the refrigerant system battery heat exchanger, the refrigerant system comprising:
a compressor,
a plurality of valves for controlling the flow of refrigerant;
a plurality of thermal expansion valves for controlling phase changes in the refrigerant;
a refrigerant system external heat exchanger for transferring heat to or from and ambient environment;
a coolant system battery heat exchanger;
a coolant system in fluid communication with the coolant system battery heat exchanger, the coolant system comprising:
a radiator in fluid communication with an engine for removing heat from the engine to the ambient environment;
a thermostat for opening or closing a fluid loop;
a pump to move a fluid through the coolant system; and
a plurality of coolant valves for controlling the flow of coolant to the engine, the radiator and the coolant system battery heat exchanger; and
a controller configured to:
determine a temperature of a set of batteries;
determine an ambient air temperature;
send a set of signals to one or more the coolant system and the refrigerant system to perform one or more of:
remove heat from the engine and add heat to the ambient environment;
remove heat from the engine and add heat to the set of batteries;
remove heat from the refrigerant system and add heat to the environment;
remove heat from the refrigerant system and add heat to the set of batteries;
an exhaust gas heat exchange system comprising: an exhaust gas heat exchanger; and a set of exhaust gas heat exchange valves for controlling the flow of exhaust gas relative to the exhaust gas heat exchanger battery heat exchanger; wherein the set of signals comprises a signal to the set of exhaust gas valves to open a fluid circuit to remove heat from exhaust gases from the engine to the exhaust gas battery heat exchanger to add heat to the set of batteries or remove heat from the set of batteries and add heat to the exhaust gases from the engine.

2. The thermal management system of claim 1, wherein:
the set of signals comprises a signal to the plurality of coolant valves to open a fluid circuit to remove heat from the engine to add heat to the set of batteries.

3. The thermal management system of claim 1, wherein:
the set of signals comprises a signal to the plurality of refrigerant valves to open a fluid circuit to remove heat from the engine to add heat to the set of batteries.

4. The thermal management system of claim 1, wherein the refrigerant system comprises:
a cab heat exchanger for transferring heat to or from a cab; and
an ambient environment heat exchanger for transferring heat to or from the ambient environment;
wherein controller is configured to:
determine a cab temperature;
determine an ambient environment temperature; and
communicate a set of signals to the plurality of refrigerant valves to open a fluid circuit to remove heat from one or more of the cab and the ambient environment to add heat to the set of batteries or remove heat from the set of batteries and add heat to one or more of the cab and the ambient environment.

5. A method for cooling a set of batteries in a vehicle, the method performed by a system controller communicatively coupled to a plurality of sensors, the method comprising:
determining a battery temperature for the set of batteries;
determining an ambient air temperature;
determining an engine temperature;
determining a cab temperature; and
performing one or more of:
sending a set of signals to one or more valves of a plurality of valves of a coolant system to open a fluid circuit including a coolant system battery heat exchanger, an engine and a radiator to remove heat from the engine and add heat to the set of batteries, to remove heat from the engine and the set of batteries to the ambient environment or remove heat from the ambient environment and add heat to the set of batteries;
sending a set of signals to a compressor to cause fluid to flow through a refrigerant system and one or more valves of a plurality of valves to open a fluid circuit including a refrigerant system battery heat exchanger, the compressor, a cab heat exchanger and a refrigerant system external heat exchanger and a plurality of expansion valves to remove heat from the set of batteries and add heat to the cab or the ambient environment or remove heat from the cab or the ambient environment and add heat to the set of batteries;
determining an exhaust gas temperature; and performing one or more of: sending a set of signals to one or more valves of a plurality of valves of an exhaust gas system to open a fluid circuit including an exhaust gas battery heat exchanger and an exhaust gas heat exchanger to remove heat from exhaust gas and add heat to the set of batteries or to remove heat from the exhaust gas to the ambient environment.

6. The method of claim 5, further comprising sending a signal to a pump to circulate fluid through one or more of the coolant system battery heat exchanger, the refrigerant system battery heat exchanger, an ambient air battery heat exchanger or the exhaust gas battery heat exchanger.

7. A method for cooling a set of batteries in a vehicle, the method performed by a system controller communicatively coupled to a plurality of sensors, the method comprising:
   determining a battery temperature for the set of batteries;
   if the battery temperature is less than a minimum battery temperature:
      determining an ambient air temperature;
      if the ambient air temperature is greater than the minimum battery temperature, sending a signal to a battery fluid pump to pump fluid through an ambient air battery heat exchanger;
      determining an exhaust gas temperature;
      if the exhaust gas temperature is greater than the minimum battery temperature:
         sending a signal to the battery fluid pump to pump fluid through an exhaust gas battery heat exchanger; and
         sending a signal to an exhaust gas system to open a fluid loop comprising the exhaust gas battery heat exchanger;
      determining a coolant temperature;
      if the coolant temperature is greater than the minimum battery temperature:
         sending a signal to a battery fluid pump to pump fluid through a coolant battery heat exchanger; and
         sending a signal to a coolant system to open a fluid loop comprising the coolant battery heat exchanger;
   determining a cab temperature; and
   performing one or more of:
      sending a set of signals to one or more valves of a plurality of valves of a refrigerant system to open a fluid circuit including a refrigerant system battery heat exchanger, a compressor, a cab heat exchanger and a refrigerant system external heat exchanger and a plurality of expansion valves to remove heat from the set of batteries and add heat to the cab or the ambient environment or remove heat from the cab or the ambient environment and add heat to the set of batteries.

8. The method of claim 7, wherein the coolant system battery heat exchanger, the refrigerant system battery heat exchanger, the ambient air heat exchanger and the exhaust gas battery heat exchanger form a single fluid loop.

* * * * *